F. A. ROBINSON.
STEERING GEAR.
APPLICATION FILED NOV. 27, 1912.
1,191,095.
Patented July 11, 1916.
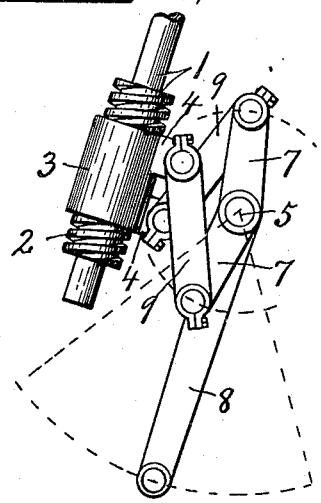
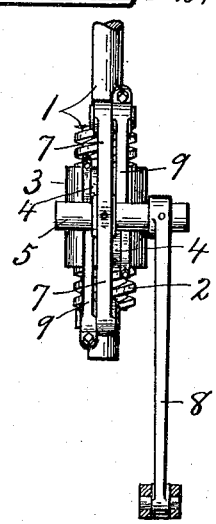
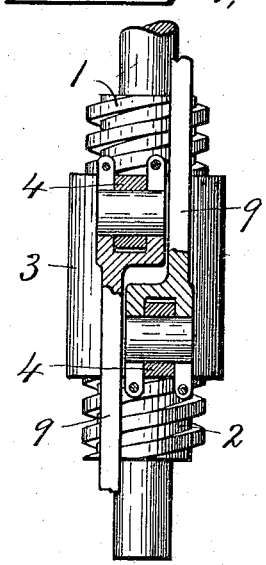
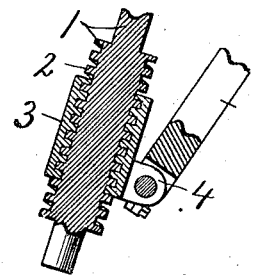
Witnesses
H. W. Hurst
H. E. Chase
F. A. Robinson
Inventor
By Howard P. Hudson
Attorney.

UNITED STATES PATENT OFFICE.

FRANK A. ROBINSON, OF AUBURN, NEW YORK, ASSIGNOR TO STANFORD HARMON, OF CHICAGO, ILLINOIS.

STEERING-GEAR.

1,191,095.  Specification of Letters Patent.  Patented July 11, 1916.

Application filed November 27, 1912. Serial No. 733,865.

*To all whom it may concern:*

Be it known that I, FRANK A. ROBINSON, of Auburn, in the county of Cayuga, in the State of New York, have invented new and useful Improvements in Steering-Gears, of which the following, taken in connection with the accompanying drawings, is a full, clear, and exact description.

This invention relates to certain improvements in steering gears for automobiles, motor boats and other motor vehicles and refers more particularly to the means for transmitting motion from the steering post to the steering arm.

In the present commercial type of steering gear most commonly employed a worm is secured directly to the steering post and meshes with a toothed segment on the rock shaft of the steering arm so that the entire strain of steering and vibration or back lash of the wheels is borne by two (or three at the most) of the teeth and threads which soon become worn to such an extent as to require their replacement by new worms and segments and always introduces one of the most serious danger factors in the operation of the machine. This excessive wear and battering of the intermeshing elements is also due to the relatively high degree of leverage exerted upon the worm and segment by reason of the almost constant vibration of the wheels in passing over more or less rough pavements.

The object, therefore, of my present invention is to eliminate as far as possible this excessive wear and at the same time to increase the resistance to undue vibration of the steering wheels by materially increasing the bearing area between the worm and member actuated thereby, and also by reducing the relative leverage between the steering arm and said member.

Other objects and uses relating to specific parts of the steering gear will be brought out in the following description.

Figures 1 and 2 are respectively a side elevation and an edge view of a portion of a steering gear embodying the features of my invention. Fig. 3 is an enlarged top plan partly in section of the same device. Fig. 4 is an enlarged edge view of the worm and nut and adjacent ends of the links partly in section. Fig. 5 is a lengthwise sectional view of the worm and nut and adjacent end of one of the links seen in Fig. 1.

In carrying out the objects stated, a steering post —1— is provided with a worm —2— of suitable length and preferably double threaded for receiving an axially movable nut —3— having radial lugs —4— projecting from its opposite ends in staggered relation for a purpose presently described.

A rock shaft —5— is journaled in suitable bearings —6— at one side of the steering post —1— and worm —2— and is provided with oppositely projecting crank-arms —7— and a steering arm —8—, the latter being located some distance to one side of the crank arms which in this instance are disposed in the same plane transversely of the shaft.

The outer ends of the crank arms are flexibly connected by separate links —9— to their respective lugs —4— so that when the nut —3— is moved axially in reverse directions by reverse rotation of the steering post in the usual manner, the links —9— will impart rocking motion to the shaft —5—, crank arms and steering arm —9— in one direction or the other according to the direction of movement of the steering post, thereby operating the steering wheels through the medium of well known connections not necessary to herein illustrate or describe.

The links —9— are pivotally connected to the crank arms —7— and to the lugs —4— and are normally disposed between the rock-shaft —5— and nut —3— in intersecting planes so as to overlap for compactness and also for obtaining the desired direction of movement of the steering wheels when the steering post is rotated in a certain direction. This arrangement of the links also permits the use of relatively long crank arms on the rock shaft so that the power of end thrust on the nut caused by the vibration or "back lash" of the steering wheels will not be so great as if the crank arms were relatively short as compared with the radius of the toothed segment commonly employed, thereby reducing the pounding effect upon the worm and nut and incidentally reducing the wear of such parts.

Another distinct advantage of this device is that the nut —3— embraces a relatively large number of threads at once, thereby affording a large bearing area to not only resist end thrust but also to increase the wearing qualities of the whole device and at the same time enables the steering wheels to be operated easily and positively.

By arranging the links —9— diagonally or at an angle to the axis of the steering post as shown the liability of a "dead lock" is reduced to a minimum and the operator is enabled to shift the steering wheels from their neutral position with ease and rapidity.

The operation of my invention will now be readily understood upon reference to the foregoing description and the accompanying drawing but it is evident that the connections between the crank-arms and nut may be somewhat varied without departing from the spirit of such invention.

What I claim is:

1. In a steering gear for motor vehicles, the combination of a steering post, a screw rigid thereon, a nut engaged with the screw, separate links pivoted to the nut on the same side thereof, a rock shaft at the same side of the nut as the links provided with oppositely projecting crank arms to which said links are pivotally connected and a separate crank arm secured to the rock shaft.

2. In a steering gear for motor vehicles, the combination of a steering post, a screw rigid thereon, a nut engaged with the screw, separate links pivoted to the nut on the same side thereof and extended in reverse directions across each other, and a rock shaft at the same side of the nut as the link and provided with oppositely projecting crank arms pivotally connected to their respective links, and a separate crank arm secured to the rock shaft.

3. In a steering gear for motor vehicles, the combination of a steering post, a screw rigid thereon, a nut engaged with the screw, separate links pivoted to opposite ends of the same side of the nut and extended in reverse directions across each other, and a rock-shaft at the same side of the nut as the links and provided with oppositely projecting crank arms pivotally connected to their respective links, and a separate crank arm secured to the rock-shaft for connection to the steering wheels of the vehicle.

4. The combination of a controlling member having a screw rigid thereon, a nut engaged with said screw, separate links pivoted to said nut and extended in reverse directions across each other and a rock shaft provided with oppositely projecting crank arms pivotally connected to said respective links.

5. The combination of a controlling member having a screw rigid thereon, a nut enveloping said member and meshing with said screw, separate links pivoted to said nut and extended in reverse directions across each other and a controlled member provided with oppositely projecting crank arms pivotally connected to said respective links.

In witness whereof I have hereunto set my hand this 15th day of November, 1912.

FRANK A. ROBINSON.

Witnesses:
H. E. CHASE,
EVA E. GREENLEAF.

Copies of this patent may be obtained for five cents each, by addressing the "Commissioner of Patents, Washington, D. C."